W. J. MILLER.
APPARATUS FOR PRESSING GLASS ARTICLES.
APPLICATION FILED JAN. 21, 1914.

1,130,920.

Patented Mar. 9, 1915.
4 SHEETS—SHEET 2.

WITNESSES

INVENTOR

W. J. MILLER.
APPARATUS FOR PRESSING GLASS ARTICLES.
APPLICATION FILED JAN. 21, 1914.
1,130,920.
Patented Mar. 9, 1915.
4 SHEETS—SHEET 3.
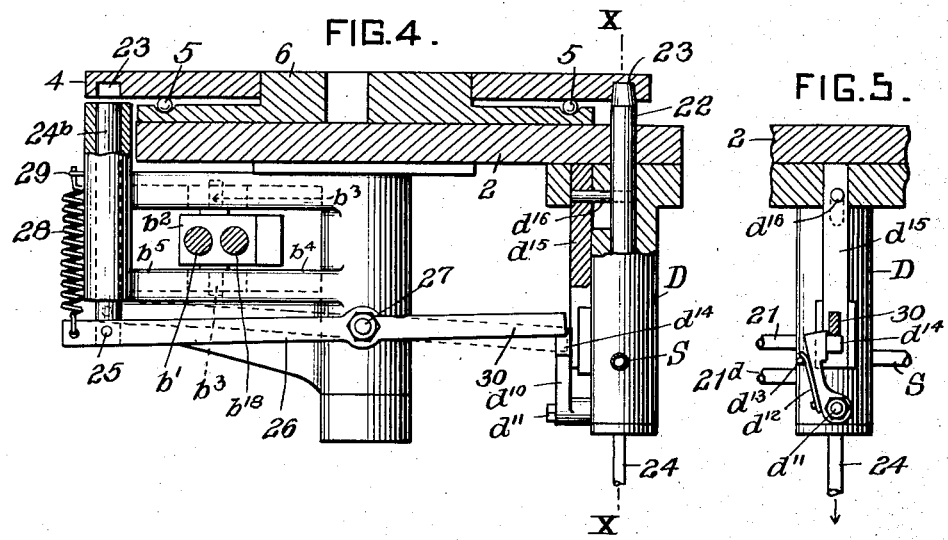
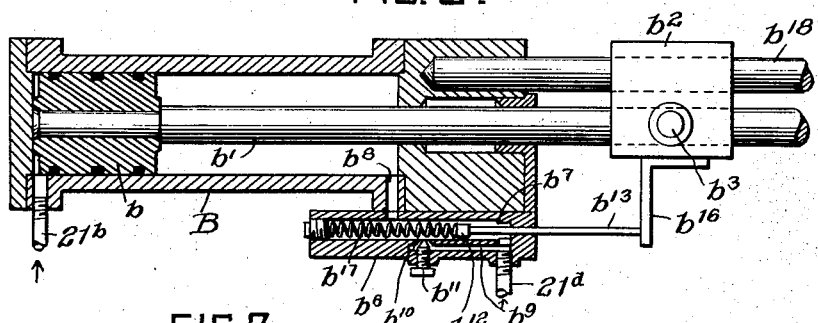
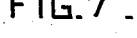
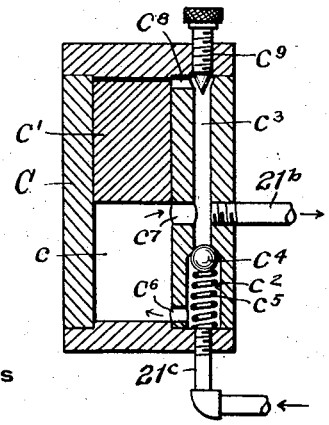
WITNESSES
INVENTOR

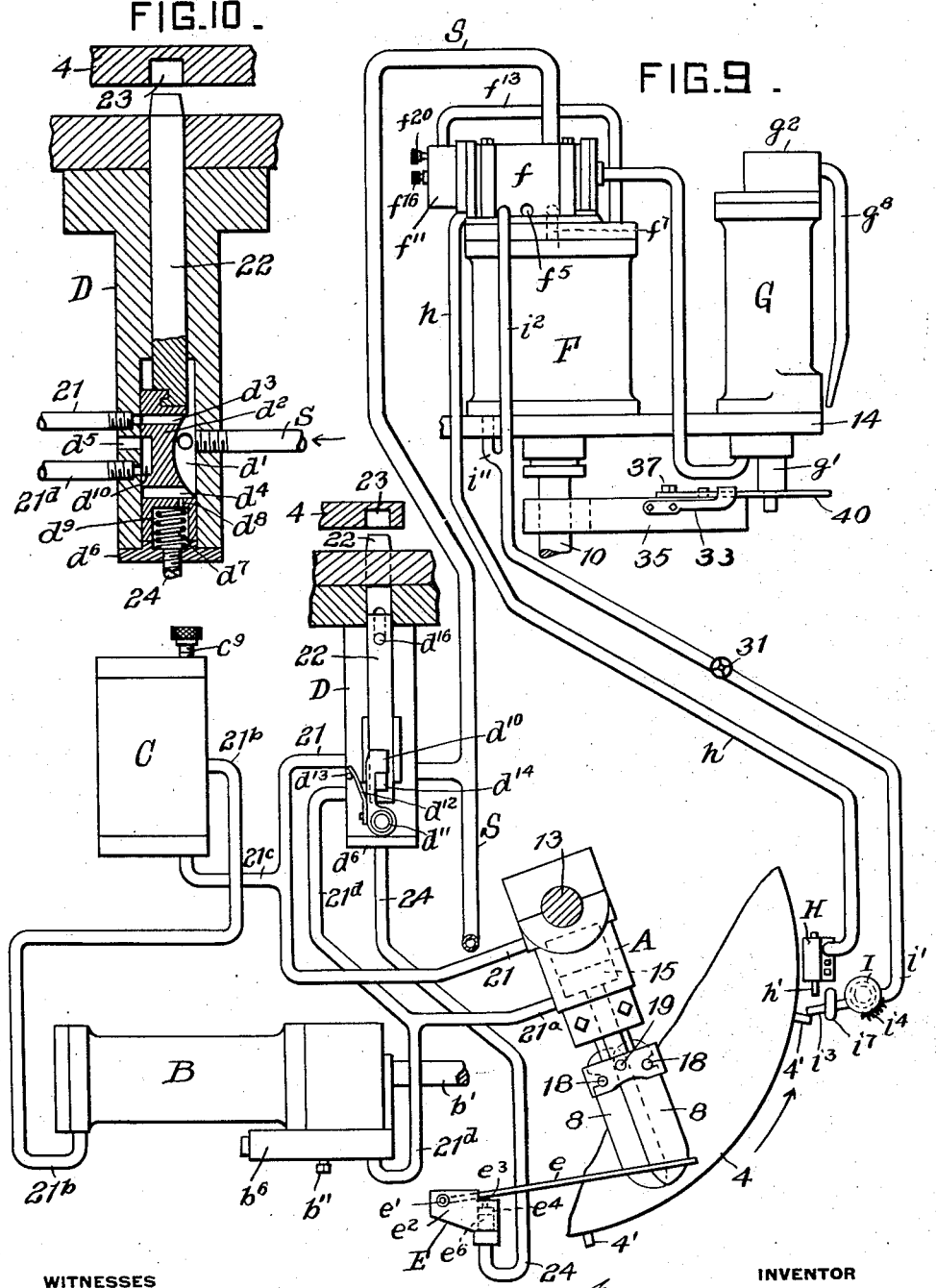

UNITED STATES PATENT OFFICE.

WILLIAM J. MILLER, OF SWISSVALE, PENNSYLVANIA.

APPARATUS FOR PRESSING GLASS ARTICLES.

1,130,920. Specification of Letters Patent. Patented Mar. 9, 1915.

Original application filed April 9, 1913, Serial No. 760,057. Divided and this application filed January 21, 1914. Serial No. 813,437.

*To all whom it may concern:*

Be it known that I, WILLIAM J. MILLER, a citizen of the United States, residing at Swissvale, in the county of Allegheny and State of Pennsylvania, have invented certain new and useful Improvements in Apparatus for Pressing Glass Articles, of which the following is a specification.

My invention consists of an improvement in an apparatus or machine for pressing glass articles, and has for its object to provide, in a machine of this type, automatically operative mechanism for performing the several operations, by means of fluid pressure actuated mechanism, embodying initiating timing, retarding, actuating and locking devices for performing the several operations continuously, under the control of the operator, as shall be more fully hereinafter described.

The machine embodying the improvements is one of a well-known type in which a plurality of glass pressing molds are mounted upon an intermittently rotatable table, the machine having actuating mechanism for intermittently swinging the table and the molds, locking and unlocking the table, cushioning the stroke of the table shifting mechanism, shears and means for actuating them, plunger mechanism and operating mechanism therefor, means for augmenting, maintaining uniform, or reducing the pressure of the plunger in the glass, etc., said parts being actuated by a compressed fluid, as air, and embodying the several features of improvement hereinafter described.

The present invention particularly refers to the mechanism for actuating and locking the table, valve mechanism, etc., the application being a division of my prior application filed Apr. 9, 1913, Serial No. 760057.

Figure 1:
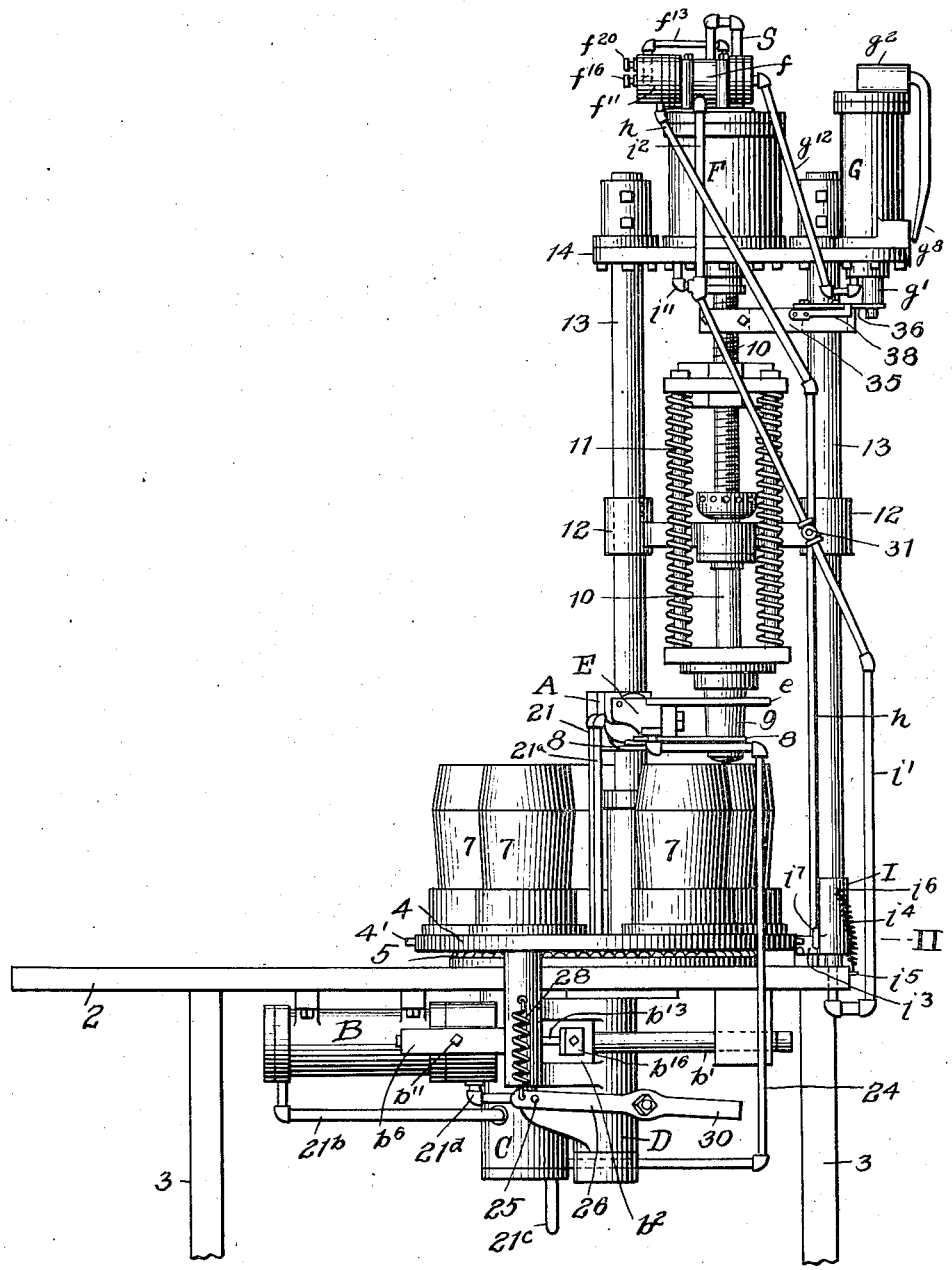
Figure 2:
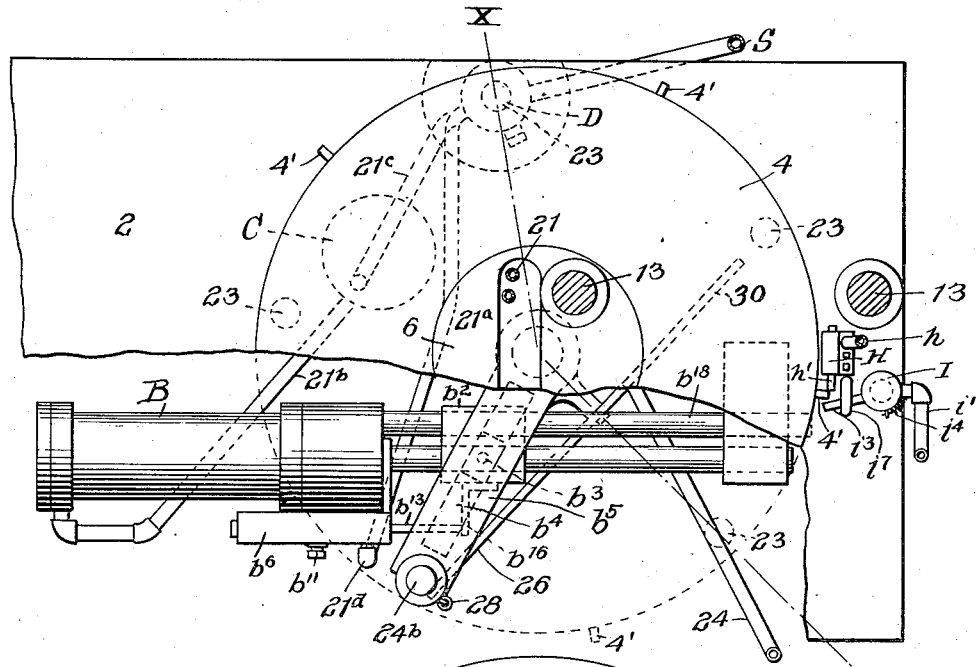
Figure 3:
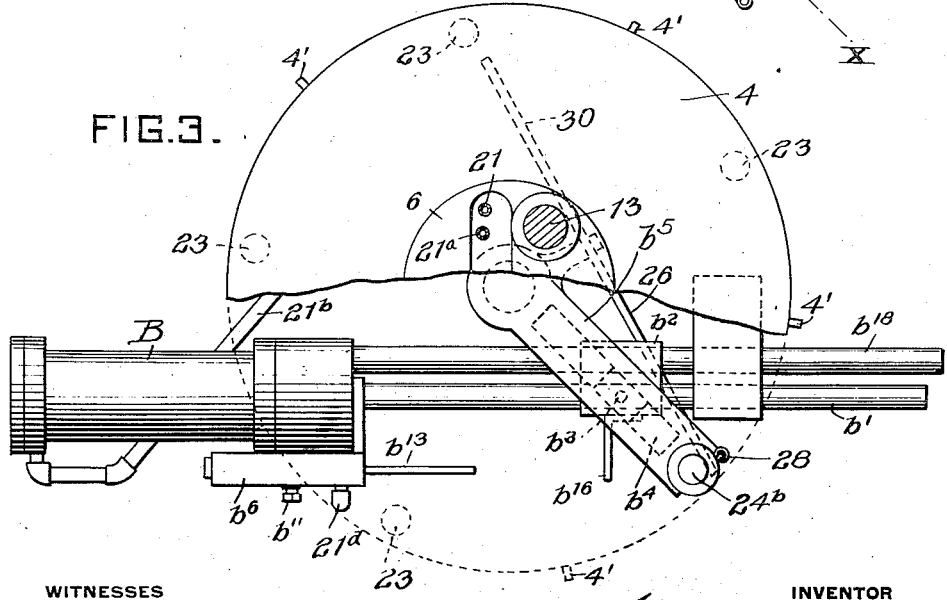

In the drawings illustrating one preferred form of the invention,—Figure 1 is a view of the machine in side elevation. Fig. 2 is a horizontal sectional view, partly broken away, indicated by the line II. II. of Fig. 1. Fig. 3 is a similar view, showing the shifting mechanism in a different position. Fig. 4 is an enlarged sectional view, indicated by the line IV. IV. of Fig. 2, showing the rotating and locking mechanism for the table. Fig. 5 is a sectional detail view at right angles to Fig. 4, showing the inner portion of the locking cylinder and the latch device for the shifting lever. Fig. 6 is a horizontal sectional view of the shifting cylinder and its connected parts. Fig. 7 is an enlarged sectional detail view of the retarding valve interposed between the said automatic valve and the shifting cylinder. Fig. 8 is a sectional detail view of the releasing valve for initiating the several operative movements of the different parts. Fig. 9 is a diagrammatic view showing the several operating parts in segregated arrangement with their connected piping, etc. Fig. 10 is an enlarged sectional detail view of the automatic valve mechanism for locking the table, indicated by the section line X. X. of Fig. 4, showing the valve lowered and the locking pin retracted.

The machine as a whole consists of the several main features comprising the frame of the apparatus, embodying a main stationary table 2 carried by any suitable frame work, as columns or legs 3, usually provided with supporting wheels, whereby the apparatus may be moved around upon the floor.

Rotatably mounted above the table 2 is the mold supporting table 4 of circular form, revolubly carried on a series of supporting balls 5 running in a suitable annular groove and around a central supporting spindle or standard 6 of well-known construction, or in any other convenient manner, whereby to center the mold supporting table for its intermittent revolution and operation.

Mounted upon the table 4 are a plurality of glass pressing molds 7, five being shown in the machine illustrated, so located and spaced as to be brought consecutively in register with a pair of shear blades 8 and a pressing plunger 9, located vertically above the molds.

The machine is so designed and the several working parts so proportioned and arranged as to effect the cutting off of the molten glass by the shears when it is held between them above the mold by the workman; to effect shifting rotation of the table carrying the mold and molten glass around one space to register with the plunger; to time the operation of the table shifting mechanism under the control of the initial controlling release valve to provide sufficient time for the cutting and dropping of the glass before the table is actuated; to shift the table and to cushion or retard its actuating mechanism at the end of its movement, avoiding jars or shocks; to then automatically actuate release valve mechanism by an abutment on the table itself to set the plunger mechanism into motion by its controlling valve, embodying timing and pressure-controlling valve mechanism; to withdraw the plunger; and to effect the performance of these several functions through interacting and interdependent fluid pressure connections and mechanism, adapted to carry out the functions without any attention from the operator, after actuating the initial release valve.

The shears are operated by the piston of the fluid-controlled cylinder A. The table 4 is shifted by the piston of the fluid controlled cylinder B, mounted beneath the table with its connected parts, the fluid supply thereto having circulation through a retarding valve C under control of the automatic valve D, which is in direct communication with the initial release or bleeder valve E, the automatic valve D being directly connected to the main air supply pipe S.

The plunger 9 is mounted at the lower end of the usual spindle 10, with the accompanying spring mechanism 11 for cushioning the stroke, vertically sliding by its frame 12 on spindles 13, spindle 10 extending into the plunger cylinder F mounted on the supporting bracket 14, carried by columns 13. The timer G for the plunger cylinder is mounted on the same bracket, as shown, and is directly connected with the valve casing $f$ of the plunger cylinder F, whereby to control the shifting operation thereof. The supply and exhaust of fluid pressure to the cylinder F to effect lowering of the plunger at a predetermined speed and limit of pressure, is controlled by the valve and its parts in casing $f$.

Incidentally, the invention has in view to provide plunger mechanism so controlled as to avoid undue pressure of the molten glass within the mold, to prevent "stalling" or interruption of the operation of the plunger due to any obstruction; to control the dwell of the plunger within the glass in the mold, and the amount and pressure of the actuating fluid, independent of the pressure in the main line 2. The valve of plunger cylinder F is, like automatic valve D, in direct communication with main air supply S, the operation of the valve $f^2$ and of its controlled plunger being subject to the retarding action of embodied mechanism, hereinafter described.

*Shear mechanism.*—The shear mechanism A consists of a cylinder mounted upon one of the standards 13 having a piston head 15 on the inner end of a stem 16 extending out through the end of the cylinder A, having a terminal cross head 17 provided with pins 18, 18, in notched engagement with the rear outer portions of blades 8, said blades being pivoted on a rivet or stud 19 carried in a suitable support 20 extending out underneath cross head 17. Support 20 is loosely clamped underneath extension support $a$ of cylinder A and is held thereto by bolts $a'$ which pass through extension $a$ and are tapped into a cross-bar $a^2$ which in turn is connected by soldering or otherwise to leaf spring $a^3$ extending out underneath the pivoting portions of shear blades 8, to hold them together in shearing contact. By this means bar $a^2$ and support 20 are held tightly in position. The shears and support 20 may thus be bodily removed by loosening bolts $a'$, the construction effecting close adjustment of the shears with relation to each other and the top of the mold, and quick changing of blades. Fluid pressure is supplied to cylinder A by branch pipe 21, which is in direct communication by its upper terminal with the interior of the automatic valve D.

*Plunger cylinder valve.*—The valve controlling the plunger piston is located within valve casing $f$ on top of the cylinder F. At one end of valve casing $f$ is a supplemental valve casing $f^{11}$ having a chamber which is in communication with the cylinder F above the plunger head by pipe $f^{13}$ as more fully described in application Serial No. 760,057. When the valve in casing $f$ is thrown over to the left, upon release of pressure from pipe $h$, due to release valve H, plunger 9 descends to the full limit of its downward travel, the plunger entering into the mold 7. It is desirable that the plunger be maintained in the glass at a pressure considerably less than that of the main supply pipe S, to prevent crushing or straining of the glass, and to maintain the pressure by the plunger at a limited maximum pressure. It is therefore desirable to cut off the pressure on the plunger head when a predetermined pressure in cylinder F has been reached, and to maintain such reduced pressure on the plunger until the pressing operation is completed, and the plunger withdrawn. It may be also desirable to slightly or gradually increase the pressure after the plunger is in the mold, or to gradually reduce the pressure, before withdrawal from the mold. This is accomplished by the above referred to construction.

*Automatic valve D.*—This valve has a four-fold function; first, to unlock and lock the rotatable table 4 by its reciprocable stem 22 having the tapered terminal adapted to interengage with the registering socket 23 in the under portion of table 4, under control of the initial release valve E; second, to admit direct air pressure to cylinder A to close the shears upon actuation of release valve E, and to open the shears; third, to supply retarded air pressure to table shifting cylinder; and fourth, to supply air pressure to the other end of shifting cylinder B to reverse the shifting mechanism for the next movement. To this end the automatic valve D is provided in its lower portion with a cylindrical valve chamber $d'$, within which is mounted the vertically reciprocating controlling valve $d^2$ connected with the lower end of plunger rod 22, as shown in Fig. 10, the valve $d^2$ having a reduced middle area of cross section, transverse air supply ports $d^3$ and $d^4$ respectively, and an exhaust port $d^{10}$ adapted to register with pipe 21 or $21^d$ respectively and with port $d^5$ opening to the atmosphere.

Inserted between the lower end or cap $d^6$ of the casing of valve D and the lower end of said valve $d^2$ is a cushioning spring $d^7$, a minute leakage port $d^8$ communicating from port $d^4$ to the lower cavity of the casing. Said cavity is in communication with the release or bleeder valve E by a pipe 24, connected at its other end with the lower portion of said valve (see Fig. 8) and the releasing valve is adapted to effect release of air pressure from cavity $d^9$ of valve D upon the lowering of a lever $e$ pivoted on the bracket $e^2$ of valve E. Lever $e$ bears downwardly upon a stem $e^3$ of an outlet valve $e^4$, being normally held to its seat by a cushioning spring $e^5$ within a valve casing $e^6$.

It will be understood that, in the operation of the machine, the workman having lowered the molten glass on the end of his punty rod into the upper portion of the mold and in register with the shear blades 8, he lowers the punty rod upon lever $e$ at the proper moment, thereby releasing pressure through pipe 24 from cavity $d^9$, whereupon the air pressure in valve chamber $d'$ immediately lowers valve $d^2$, bringing port $d^3$ into register with pipe connection 21 and its inner terminal communicating port, thereby establishing fluid pressure by pipe 21 to the inner end of shear cylinder A, actuating plunger 15 outwardly, cutting off the glass, and dropping it into the mold.

*Shifting cylinder and retarding valve.*—It is desirable that the operation of the rotatable table to carry the filled mold around into the next position in register with plunger 9 be temporarily retarded after the admission of air pressure to the shear cylinder in order to give sufficient time for the sheared glass unit to settle within the mold, and for such purpose I provide the

*Retarding valve C.*—This valve consists of a vertically cylindrical casing within which is a vertical chamber $c$ in which is mounted a snugly fitting weighted reciprocable head $c'$ adapted to open and close circulation ports and effect resulting circulation of main air pressure from branch pipe $21^c$. Said pipe $21^c$ opens into the bottom of the casing C at one side thereof and into the lower end of a chamber $c^2$ having an upwardly extending port $c^3$ and intervening check valve $c^4$ seating against a closing seat, cutting off communication and normally pressed upwardly by a cushioning spring $c^5$, and direct air pressure, when furnished. A port $c^6$ communicates between chamber $c^2$ and main chamber $c$ at the lower end of the casing, a similar port $c^7$ communicating between chamber $c$ and port $c^3$ at a higher level and substantially opposite the inner end of a utilizing supply pipe connection $21^b$, leading to shifting cylinder B. Upon valve $d^2$ of automatic valve D being lowered, upon actuation of releasing valve E, direct air pressure passes to branch pipe $21^c$ and through port $c^6$ underneath weight $c'$, lifting it to the top of cylinder $c$, uncovering port $c^7$ and establishing communication to pipe $21^b$ and shifting cylinder B. At the same time direct air pressure passes upwardly through port $c^3$ and through transverse port $c^8$ to the upper end of chamber $c$, thereby equalizing the pressure and allowing weight $c'$ to fall, and thus cutting off the supply of air to shifting cylinder B, at the termination of its stroke. A controlling valve $c^9$ accurately adjusts the amount of circulation through port $c^8$ in either direction, whereby to adjust or control the speed of operation of the weight $c'$, either upwardly or downwardly. When weight $c'$ is raised, air will pass freely by pipe $21^b$ to shifting cylinder B, operating it before the weight $c'$ falls.

*Shifting cylinder B.*—This cylinder is mounted stationarily in the main frame below stationary table 2 (see Fig. 1), and is designed for shifting table 4 more or less promptly upon cutting off the glass into one of the molds 7, under control of retarding valve C. It is provided with a piston head $b$ and a reciprocable plunger rod $b'$ extending out through one end of the cylinder and connected by a cross head $b^2$ having a pin $b^3$ and a suitable sliding block within a slot $b^4$ of shifting arm $b^5$ rotatably mounted on the central spindle of the machine, and carrying at its outer end a vertically reciprocable shifting pin $24^b$. Said pin, like locking pin 22, is adapted to engage one of the sockets 23 in the under edge portion of rotatable table 4 to shift the table. At its lower end pin $24^b$ is pivotally connected, as at 25, with shifting lever 26 pivoted at 27 on the hub portion of the shifting arm $b^5$ which is rotatably mounted around the central spindle. A spring 28 normally lifts the outer end of lever 26 and pin $24^b$, by its connection with the lever at one end, and with a connecting pin or eye 29 at the other end secured to the housing of pin $24^b$ at the outer end of arm $b^5$. Spring 28 acts to hold pin $24^b$ up against the under side of table 4 during reverse movement of the plunger head $b$ of cylinder B, and to draw it into interlocking engagement with registering socket 23 when thrown back for the next operation, after having shifted the table. Upon admission of fluid pressure by pipe $21^b$ through the retarding valve, as above described, upon lowering of valve $d^2$, the inner end 30 of lever 26, (being lowered to the position indicated in dotted lines in Fig. 4) rides around and engages against the face of locking latch $d^{10}$. Said latch is pivoted at $d^{11}$ and is provided with a pressure spring $d^{12}$ bearing against an abutment $d^{13}$, tending to normally throw the latch over the projecting end or lug $d^{14}$ of an arm $d^{15}$ connected by pin $d^{16}$ with the central stem 22 of valve D. Arm $d^{15}$ is thus actuated by stem 22 of valve $d^2$ when raised by air pressure in chamber $d'$ and balancing spring $d^7$, upon equalization of pressure in cavity $d'$ and $d^9$ through port $d^8$, upon closing of initiating release valve E. When valve $d^2$ and stem 22 are lowered, however, spring actuated latch $d^{10}$ engages over the top of lug $d^{14}$, holding the valve and stem downwardly, until released. Upon arm extension 30 swinging around upon rotation of the table by actuation of shifting cylinder B, it strikes against the upper end of latch $d^{10}$, throwing it over from engagement, whereupon arm $d^{15}$ rises under action of the air pressure and balancing spring $d^7$, inserting tapered end of plunger 22 in socket 23 to hold the table, and at the same time withdrawing plunger rod $24^b$ from its socket 23, as shown in Fig. 12, ready for the reverse movement upon reversal of plunger $b'$ of shifting cylinder B. Locking spindle 22 will now remain in socket 23 until the next operation of initiating valve E. When valve $d^2$ is shifted upwardly, port $d^4$ registers with pipe $21^d$ leading to the other end of shifting cylinder B. Said pipe $21^d$ opens into the end of a cushioning valve casing $b^6$ having a main cavity $b^7$ communicating by port $b^8$ with the interior of cylinder B and with a by-pass port $b^9$ opening at one end to pipe $21^d$. Port $b^9$ has a small port $b^{10}$ opening to chamber $b^7$ controlled by a screw needle valve $b^{11}$. A valve $b^{12}$ closes one end of chamber $b^7$ toward supply pipe $21^d$ and is provided with a stem $b^{13}$ extending out beyond the inner end of cylinder B into range of abutment $b^{16}$ on crosshead $b^2$, a spring $b^{17}$ normally pressing valve $b^{12}$ to its seat to close circulation to pipe $21^d$, when crosshead $b^2$ is beyond end of stem $b^{18}$. Crosshead $b^2$ slides on rod $b^{13}$. When valve $d^2$ is lowered, giving pressure through pipe $21-21^c-21^b$ to cylinder B, pipe $21^d$ then registers with the exhaust. Port $b^{10}$ admits a throttled pressure to piston head $b$ whereby to initially move it backwardly, and abutment $b^{16}$ is so located on cross head $b^2$ that it will engage stem $b^{18}$ on the back stroke, unseating valve $b^{12}$ and giving free inward circulation to cylinder B from pipe $21^d$. On the forward stroke, valve $b^{12}$ will be held off its seat until piston $b$ has traveled part way, valve $b^{12}$ then seating by spring $b^{17}$ and throttling the exhaust from in front of piston $b$. By reason of this construction piston $b$ will be cushioned at the end of its stroke, the imprisoned air in the other end of the cylinder escaping at a controlled speed through port $b^{10}$ to pipe $21^d$ and by exhaust port $d^{10}-d^5$ to the atmosphere. The advantage of this construction and operation is that the momentum of the table 4 is checked at the end of its movement, so that the mold arrives under the plunger, the lever 30 engages latch $d^{10}$, and the several other functions are performed without shock or jar, by easing up the speed of stroke of piston $b$ at the end of its movement. After the glass is cut off the operator removes his punty rod from arm $e$, and valve E closes, spring $e^5$ seating valve $e^4$ and closing exhaust from pipe 24. Pressure from pipe S will now pass through reduced port $d^8$ to the lower side of valve $d^2$, equalizing the pressure, and valve $d^2$ will at once rise when latch $d^{10}$ is tripped by arm 30, inserting locking bolt 22 in socket 23 at the termination of the rotation of the table. At the same time port $d^4$ will supply air to pipe $21^d$, (Fig. 10) slightly unseating valve $b^{12}$ and pressure will pass around valve $b^{12}$ to the interior of cylinder B through port $b^8$, acting on piston $b$ and reversing movement of plunger $b'$ and rocker arm $b^5$, pin $24^b$ taking a new hold in the next socket 23 for the next rotation. A branch pipe $21^a$ of pipe $21^d$ being now brought into circulation with port $d^4$ of valve $d^2$, supplies direct air pressure to the front of shear operating piston 15 at the same time that air pressure is supplied to cylinder B by pipe $21^d$, thereby opening the shears, ready for the next operation. Immediately at the end of the shifting movement of the table, it is desirable that the plunger cylinder F shall be operated to lower plunger 9 into the mold. This is accomplished by means of the

*Release valve H and head I.*—The function of this valve is to release air by its connection $h$ from the end of the casing $f$ of the plunger controlling valve to shift it and admit direct air pressure to the upper end of cylinder F to lower the plunger. For such purpose, I provide a vertically reciprocable pressure-actuated gravity head I mounted upon a hollow spindle $i$ in communication by pipe $i'$ and branch $i''$ with the lower end of cylinder F and by branch pipe $i^2$ with the pressure port of valve casing $f$, as fully described in application Serial No. 760,057. Vertically reciprocable head I is lowered by means of a spring $i^4$ connected at its lower end to a retaining pin $f^5$ and arranged somewhat spirally around the outer portion of head I and connected thereto by a pin or attachment $i^6$, so as to effect a twisting or turning movement to head I as it is lowered below pin 4', effecting a similar turning movement of the wing $i^3$ outwardly away from the stem $h'$ of the release valve H. A valve or cock 31 is interposed in line of pipe $i'$ so that the operation of the valve of the plunger cylinder may be rendered inoperative, by cutting off air supply to head I whereby wing $i^3$ is maintained in a lowered position until valve 31 is opened. This is of advantage whenever it is desired to operate the machine without actuating the plunger. Wing $i^3$ is retained as to its lateral or vertical movement by a loop or keeper device $i^7$. As the table is rotated at the end of its intermittent movement, pin 4' strikes against wing $i^3$, then being held erect by pressure in pipe $i'$ which in turn strikes valve stem $h'$, thrusting backwardly its valve, effecting release of pressure from pipe $h$. The result of this movement is to exhaust air pressure from the cavity of valve casing $f$, whereby the plunger controlling valve is shifted over to the left, admitting direct air pressure to the upper side of the plunger head and lowering plunger 9 into the glass in the mold.

*Timer G.*—For the purpose of retarding the action of the plunger and of piston head F', I have provided the timer device G consisting of a cylindrical casing having a piston on a stem $g'$ extending downwardly through its bottom portion, the upper end of cylinder G having a head $g^2$ provided with an outlet port having a retained check valve, and an inlet port having a controlling stem provided with a downwardly extending arm $g^8$, the terminal of which may be set to the desired degree on a graduated dial for accurately controlling the inflow of atmospheric air to limit the downward gravitating travel of the head in the casing on stem $g'$.

*Operation.*—The operation is as follows: Compressed air having been supplied to the machine, the operator gathers a lump of glass on the end of his punty rod, dropping a predetermined quantity into the mold under the shears, and when such predetermined quantity has been lowered into the mold, he touches the small lever $e$ of initiating valve E with his punty rod. This immediately causes valve $d^2$ within casing D to fall, admitting air to rear of shear cylinder, closing the shears and cutting off the glass. Meanwhile the air in table shifting mechanism has been retarded from acting immediately by the retarding mechanism described, and after a slight delay, the table is then partially revolved, bringing the charged mold beneath the plunger and simultaneously the next empty mold under the shear. The table being locked, the valve mechanism controlling the operation of the plunger cylinder is actuated and the plunger descends into the mold and more or less fully fills the cavity. The pressure is more or less reduced, or entirely removed, or maintained equally, or slightly increased, by adjustment of the controlling valve mechanism in casing $f^{11}$ at the end of casing $f$, depending on the shape of the article to be formed, the nature of the glass and other conditions that might arise. The object in view is to imitate the action or touch of the human operator handling the lever of a hand-operated machine. When the operator pulls on the lever until he fills the mold full with glass, or nearly so, he then slightly and slowly increases the pressure, maintains it at the same point, slightly reduces it, or entirely removes it, meanwhile holding the plunger in the glass to set the ware properly, holding it there a predetermined time, depending on the article to be formed, and then withdraws it. After the plunger has remained in the glass a predetermined time, depending on the adjustment of arm $g^8$, it is withdrawn and the machine is ready for the next charge of glass, as previously described. The pressed article is then allowed to set in the mold a longer or shorter time, depending on the ware made, and is either transferred to a blow-mold to be blown into shape, or may be removed from the mold in the completed state.

What I claim is:

1. Means for shifting and locking the mold table of a glass press comprising a shifting pin, a lever connected to the shifting pin to move it in and out of engagement with the table, a locking pin having a portion adapted to actuate the lever of the shifting pin, and means for actuating the locking pin.

2. Means for shifting and locking the mold table of a glass press comprising a shifting pin, a lever connected to the shifting pin to move it in and out of engagement with the table, a locking pin having a portion adapted to actuate the lever of the shifting pin, a holding latch therefor adapted to be disengaged by the end of said lever, and means for actuating the locking pin.

3. Means for shifting and locking the mold table of a glass press comprising an annularly movable arm having a spring-actuated pin adapted to engage and swing the table, a lever pivoted on said arm connected with said pin at one end and having an opposite terminal, a locking pin for the table having a portion adapted to engage and actuate the terminal of the lever of the shifting pin, and means for actuating the locking pin.

4. Means for shifting and locking the mold table of a glass press comprising an annularly movable arm having a spring-actuated pin adapted to engage and swing the table, a lever pivoted on said arm connected with said pin at one end and having an opposite terminal, a locking pin for the table having a portion adapted to engage and actuate the terminal of the lever of the shifting pin, a holding latch for said portion adapted to be disengaged by said terminal upon making engagement with said portion, and means for actuating the locking pin.

5. In an apparatus for pressing glass articles, the combination of a rotatable mold table, a shifting arm having a spring-actuated shifting pin engaging a socket in the table, a fluid actuated locking pin for the table having a co-acting arm, a latch normally holding said arm and the locking pin retracted, and a lever pivoted on the shifting arm connected to the shifting pin and adapted to strike against and discharge the latch of the co-acting arm of the locking pin.

6. In an apparatus for pressing glass articles, the combination of a rotatable mold table, a shifting arm having a spring-actuated shifting pin engaging a socket in the table, a fluid-actuated shifting cylinder therefor, a fluid actuated locking pin for the table, a casing therefor provided with a valve controlling fluid supply to the shifting cylinder, a latch normally holding the locking pin retracted, a lever pivoted on the shifting arm connected to the shifting pin and adapted to disengage the latch of the locking pin, said valve being connected with the locking pin and operable by release of pressure from one end of the valve.

7. In an apparatus for pressing glass articles, the combination of a rotatable mold table, a shifting arm having a spring-actuated shifting pin engaging a socket in the table, a fluid actuated locking pin for the table, a casing therefor, a latch normally holding the locking pin retracted, a lever pivoted on the shifting arm connected to the shifting pin and adapted to disengage the latch of the locking pin, a fluid actuated table-shifting cylinder and means connecting it with the mold table, a valve controlling supply of fluid to said cylinder connected with the locking pin, and means for actuating said valve.

8. In an apparatus for pressing glass articles, the combination of a rotatable mold table, a shifting arm having a spring-actuated shifting pin engaging a socket in the table, a fluid actuated locking pin for the table, a casing therefor, a latch normally holding the locking pin retracted, a lever pivoted on the shifting arm connected to the shifting pin and adapted to disengage the latch of the locking pin, fluid-actuated shear mechanism having a plunger, a cylinder therefor, a valve controlling fluid supply to said cylinder connected with the locking pin, and means for actuating said valve.

9. In an apparatus for pressing glass articles, the combination of a rotatable mold table, a shifting cylinder therefor, a valve controlling fluid supply to said cylinder, and a retarding valve interposed between the controlling valve and a shifting cylinder comprising a casing having a main chamber, a displacement body therein, a longitudinal circulation channel opening into the main chamber at one end, a supply connection at one end of the circulation channel, a check valve in said channel, a port connecting the main chamber and circulation channel beyond said check valve, an outlet connection communicating with said port, and a port connecting the opposite end portions of the main chamber and circulation channel.

10. In an apparatus for pressing glass articles, the combination of a rotatable mold table, a shifting cylinder for the table, a shears and an actuating cylinder therefor, a valve controlling fluid supply to each of said cylinders, and a retarding valve interposed between the controlling valve and the shifting cylinder operable to delay its action until after the operation of the shears cylinder comprising a casing having a main chamber, a displacement body therein, a longitudinal circulation channel opening into the main chamber at one end, a supply connection at one end of the circulation channel, a check valve in said channel, a port connecting the main chamber and circulation channel beyond said check valve, an outlet connection communicating with said port, and a port connecting the opposite end portions of the main chamber and circulation channel.

11. The combination with the table shifting cylinder and the controlling valve therefor, of a retarding valve interposed in the fluid circulation line between the cylinder and valve having an inlet and an outlet port, a main chamber, a displacement body therein, a longitudinal circulation channel communicating with said inlet and outlet ports and opening into the main chamber at one end, a check valve in said channel, and a port connecting the main chamber and circulation channel beyond said check valve.

12. The combination with the table shifting cylinder and the controlling valve therefor, of a retarding valve interposed in the fluid circulation line between the cylinder and valve comprising a casing having a main chamber, a displacement body therein, a longitudinal circulation channel opening into the main chamber at one end, a supply connection at one end of the circulation channel connecting with the fluid circulation line, a check valve in said channel, a port connecting the main chamber and circulation channel beyond said check valve, an outlet connection communicating with said port and with the fluid circulation line, and a port connecting the opposite end portions of the main chamber and circulation channel.

13. A retarding valve for the shifting cylinder consisting of a casing having a main chamber, a displacement body therein, a longitudinal circulation channel opening into the main chamber at one end, a supply connection at one end of the circulation channel, a check valve in said channel, a port connecting the main chamber and circulation channel beyond said check valve, an outlet connection communicating with said port, and a port connecting the opposite end portions of the main chamber and circulation channel.

14. A retarding valve for the shifting cylinder consisting of a casing having a main chamber, a displacement body therein, a longitudinal circulation channel opening into the main chamber at one end, a supply connection at one end of the circulation channel, a check valve in said channel, a port connecting the main chamber and circulation channel beyond said port, a port connecting the opposite end portions of the main chamber and circulation channel, and a valve controlling circulation therethrough.

15. A retarding valve for the shifting cylinder consisting of a casing having a main chamber, a displacement body therein, a longitudinal circulation channel opening into the main chamber at one end, a supply connection at one end of the circulation channel, a spring pressed check valve in said channel, a port connecting the main chamber and circulation channel beyond said check valve, an outlet connection communicating with said port, and a port connecting the opposite end portions of the main chamber and circulation channel.

16. The combination with the mold table, of a fluid-actuated shifting piston operatively connected therewith, a cylinder for said piston having a cushioning valve casing provided with a main cavity communicating with the interior of the cylinder and with a pressure supply, a spring-actuated valve therein operable to close said supply, said valve casing having a by-pass port communicating with said pressure supply and with said main cavity, a throttling needle valve for controlling the flow between said by-pass port and main cavity whereby to restrict circulation therethrough, and means for unseating said spring-actuated valve during a portion of the stroke of the piston.

17. The combination with the mold table and the swinging arm for shifting the table, of a shifting cylinder having a reciprocable piston and a stem provided with a crosshead having sliding engagement with the arm, a cushioning valve casing on said cylinder provided with a main cavity communicating with the interior of the cylinder and with a pressure supply, a spring-actuated valve therein operable to close said supply and having an extended stem, said valve casing having a by-pass port communicating with said pressure supply and with said main cavity, a throttling needle valve for controlling the flow between said by-pass port and main cavity whereby to restrict circulation therethrough, and an abutment on the crosshead adapted to engage the extended stem of said spring-actuated valve to unseat it during return stroke of the piston and to release said stem during forward stroke of the piston.

18. The combination with the mold table and a swinging arm for shifting the table, of a shifting cylinder having a reciprocable piston and a stem provided with a crosshead having sliding engagement with the arm, fluid pressure connections at each end of the cylinder, a valve controlling outward circulation of fluid, and an abutment on the crosshead adapted to hold said valve open during a portion of the piston stroke.

19. A table shifting cylinder having a piston and stem, a cross head thereon having an abutment, a fluid supply at one end of the cylinder for shifting, a supplemental valve casing at the other end of the cylinder having a cavity communicating with the interior of the cylinder and with a pressure connection, a valve therein adapted to close free exhaust and having a projecting stem in range of said abutment, a pressure connection, and a by-pass port communicating with said pressure connection and cavity at one side of the valve and with the cavity at the other side of the valve, substantially as set forth.

20. A table shifting cylinder having a piston and stem, a crosshead thereon having an abutment, a fluid supply at one end of the cylinder for shifting, a supplemental valve casing at the other end of the cylinder having a cavity communicating with the interior of the cylinder and with a pressure connection, a valve therein adapted to close free exhaust to the pressure connection and having a projecting stem in range of said abutment, and a by-pass port communicating with said pressure connection and cavity at one side of the valve and with the cavity at the other side of the valve, substantially as set forth.

21. A table shifting cylinder having a piston and stem, a crosshead thereon having an abutment, a fluid supply at one end of the cylinder for shifting, a supplemental valve casing at the other end of the cylinder having a valve normally held from its seat by said abutment for a portion of the piston stroke and adapted to be seated upon withdrawal of the abutment to close the exhaust and cushion the piston at the latter portion of its stroke, substantially as set forth.

22. The combination with the mold table and a longitudinally slotted swinging arm for shifting the table, of a shifting cylinder having a reciprocable piston and stem provided with a crosshead engaging the longitudinally slotted swinging arm and adapted to exert power thereon at varying distances from the table center depending on the positions of the crosshead and arm, valve mechanism embodied in the shifting cylinder for effecting exhaust from said cylinder, and a co-acting abutment controlling the operation thereof mounted on said crosshead.

23. In apparatus for pressing glass articles, the combination of an intermittently rotatable mold table adapted to support and move a series of molds successively to operative positions, a shifting cylinder therefor, a controlling valve for the shifting cylinder, a pressure supply connection thereto, pressure connections from the controlling valve to each end of the shifting cylinder, a pressure retarding device interposed in one of said connections between the controlling valve and one end of the shifting cylinder whereby to delay its operation with relation to the operation of filling one of the molds by the workman, and a releasing valve for the controlling valve adapted to open communication to the pressure retarding device and the shifting cylinder by exhausting air from the controlling valve, said releasing valve having an operating lever extending into juxtaposition with one of the molds when in stationary receiving position and operable by the punty rod of the operator in delivering glass thereto.

24. In apparatus for pressing glass articles, the combination of an intermittently rotatable mold table adapted to support and move a series of molds successively to operative position, a shifting cylinder therefor, a controlling valve for the shifting cylinder, a reciprocable locking device connected with the controlling valve and adapted to engage and lock the table, a pressure supply connection to the controlling valve, pressure connections from the controlling valve to each end of the shifting cylinder, a pressure retarding device interposed in one of said connections between the controlling valve and one end of the shifting cylinder whereby to delay its operation with relation to the operation of filling one of the molds by the workman, and a releasing valve for the controlling valve adapted to open communication to the pressure retarding device and the shifting cylinder by exhausting air from the controlling valve, said releasing valve having an operating lever extending into juxtaposition with one of the molds when in stationary receiving position and operable by the punty rod of the operator in delivering glass thereto.

In testimony whereof I hereunto affix my signature in the presence of two witnesses.

WILLIAM J. MILLER.

Witnesses:
 T. B. HUMPHRIES,
 C. M. CLARKE.